(12) United States Patent
Baughman et al.

(10) Patent No.: US 10,397,253 B2
(45) Date of Patent: *Aug. 27, 2019

(54) COGNITIVE AND CONTEXTUAL DETECTION OF MALICIOUS DNS

(71) Applicant: International Business Machines Corporation, Armonk, NY (US)

(72) Inventors: Aaron K. Baughman, Silver Spring, MD (US); Mauro Marzorati, Lutz, FL (US); Gregory A. Porpora, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,011

(22) Filed: Aug. 8, 2018

(65) Prior Publication Data
US 2018/0351974 A1   Dec. 6, 2018

Related U.S. Application Data

(63) Continuation of application No. 15/142,389, filed on Apr. 29, 2016, now Pat. No. 10,075,458.

(51) Int. Cl.
*H04L 29/06* (2006.01)
*H04L 29/12* (2006.01)
(Continued)

(52) U.S. Cl.
CPC ...... *H04L 63/1416* (2013.01); *G06F 17/2705* (2013.01); *G06F 17/277* (2013.01);
(Continued)

(58) Field of Classification Search
CPC .............. H04L 63/1416; H04L 63/029; H04L 61/2705; H04L 63/0236; H04L 63/1433;
(Continued)

(56) References Cited

U.S. PATENT DOCUMENTS

2008/0028463 A1*  1/2008  Dagon .............. H04L 29/12066
                                                                       726/22
2012/0054860 A1*  3/2012  Wyschogrod ..... H04L 29/12066
                                                                       726/22
(Continued)

*Primary Examiner* — Michael Pyzocha
*Assistant Examiner* — Huan V Doan
(74) *Attorney, Agent, or Firm* — Garg Law Firm, PLLC; Rakesh Garg; Samuel Waldbaum

(57) ABSTRACT

From a record of a packet in a Domain Name System (DNS) communication between a DNS client and a DNS server, an input feature is constructed. Using the packet, a metadata item supporting the input feature is computed. Using a processor and a memory to execute a trained cognitive classification model, and by supplying the input feature and the supporting metadata item as inputs to the cognitive classification model, a transmission of the packet is classified as malicious use of DNS tunneling between the DNS client and the DNS server. From the cognitive classification model, a classification of the packet as malicious, and a confidence value in the malicious classification are output. By generating a notification, the DNS client is caused to cease the malicious use of the DNS tunneling.

20 Claims, 10 Drawing Sheets

(51) Int. Cl.
   *G06N 3/04* (2006.01)
   *G06N 3/08* (2006.01)
   *G06F 17/27* (2006.01)
(52) U.S. Cl.
   CPC ....... *G06F 17/2785* (2013.01); *G06N 3/0445* (2013.01); *G06N 3/08* (2013.01); *H04L 61/1511* (2013.01); *H04L 63/029* (2013.01); *H04L 63/0236* (2013.01); *H04L 63/1433* (2013.01)
(58) Field of Classification Search
   CPC ............. H04L 61/1511; G06F 17/2705; G06F 17/2785; G06F 17/277; G06N 3/08; G06N 3/0445
   See application file for complete search history.

(56) References Cited

U.S. PATENT DOCUMENTS

| | | | |
|---|---|---|---|
| 2016/0065611 A1* | 3/2016 | Fakeri-Tabrizi | H04L 63/1425 726/23 |
| 2016/0127395 A1* | 5/2016 | Underwood | H04L 63/1416 726/23 |
| 2016/0294773 A1* | 10/2016 | Yu | H04L 63/1425 |
| 2016/0359887 A1* | 12/2016 | Yadav | H04L 63/1425 |
| 2017/0187747 A1* | 6/2017 | Huston, III | H04L 63/1458 |

* cited by examiner

COGNITIVE AND CONTEXTUAL DETECTION OF MALICIOUS DNS

TECHNICAL FIELD

The present invention relates generally to a method, system, and computer program product for detecting malicious data exchange in a data network. More particularly, the present invention relates to a method, system, and computer program product for cognitive and contextual detection of malicious DNS tunneling employing advanced machine-learning techniques for two-factor trustworthiness-verification.

BACKGROUND

Data exfiltration, also called data extrusion, is the unauthorized transfer of data from a computer. Such a transfer may be manual and carried out by someone with physical access to a computer or may be automated and carried out through malicious programming over a data network.

Malicious exchange of data generally introduces to or extracts data from a computer in an undesirable manner. For example, malicious exchange of data occurs not only in the form of data exfiltration but also in instructing a computer to operate in an undesirable manner known as beaconing in from a Botnet Command and Control server, causing data manipulation in a data network in an undesirable manner, or causing a computer or service to malfunction.

Often, malicious exchange of data occurs by masquerading as a benign or other expected data communication in a data network. For example, the malicious data may be hidden in a data packet intended for some other purpose which is normally regarded as benign in the data network. For example, Domain Name System (DNS) protocol describes the structure and contents of data packets used for data communication between a computer and a DNS server to resolve names of other computers or services.

The domain name resolution according to the DNS protocol is a routine communication that occurs between computers in a data network and one or more DNS servers inside and/or outside the data network.

SUMMARY

The illustrative embodiments provide a method, system, and computer program product. An embodiment includes a method that constructs, from a record of a packet in a Domain Name System (DNS) communication between a DNS client and a DNS server, an input feature. The embodiment computes, using the packet, a metadata item supporting the input feature. The embodiment classifies, using a processor and a memory to execute a trained cognitive classification model, and by supplying the input feature and the supporting metadata item as inputs to the cognitive classification model, a transmission of the packet as malicious use of DNS tunneling between the DNS client and the DNS server. The embodiment outputs, from the cognitive classification model, a classification of the packet as malicious, and a confidence value in the malicious classification. The embodiment causes, by generating a notification, the DNS client to cease the malicious use of the DNS tunneling.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
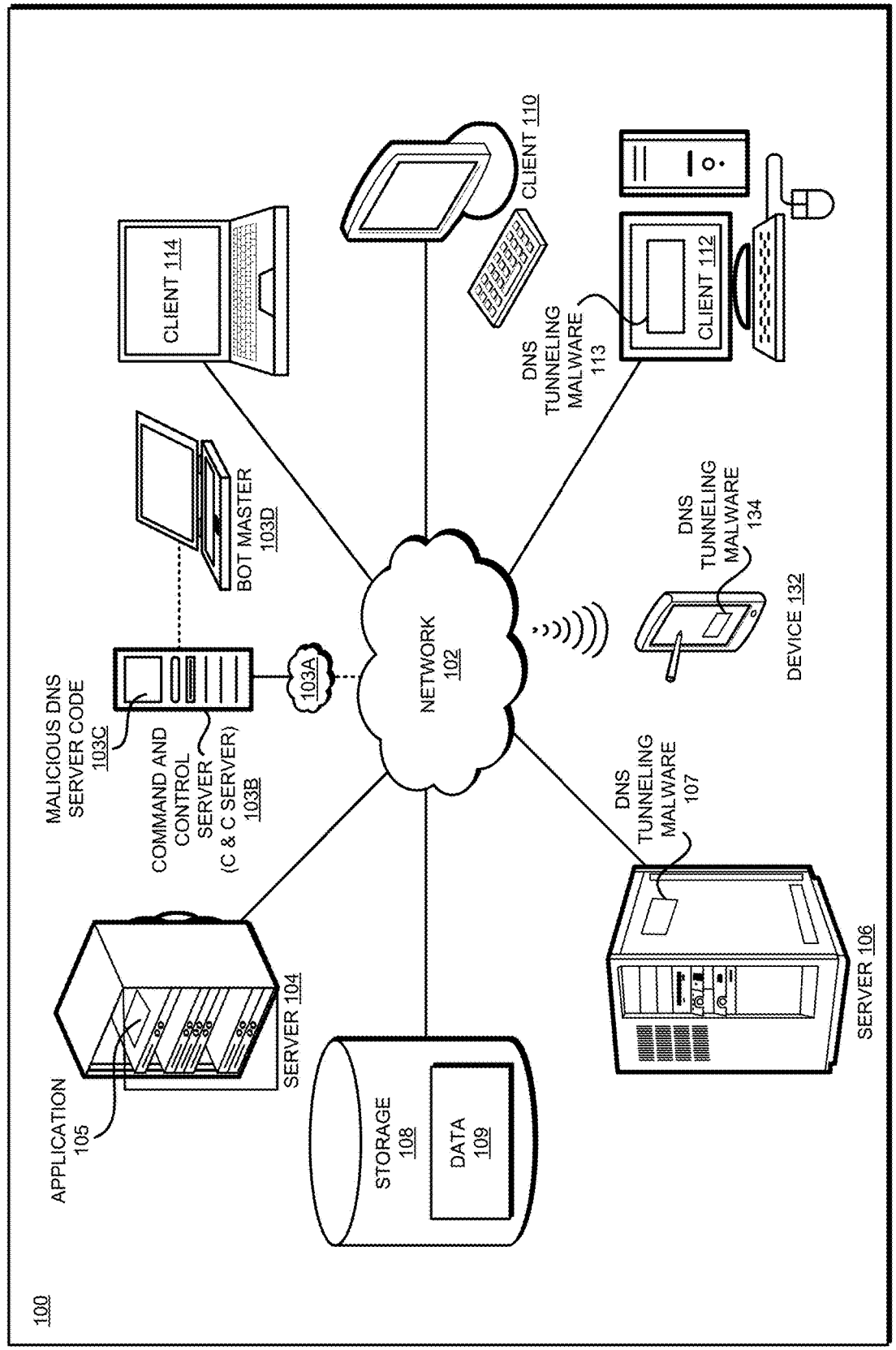
FIG. 1 depicts a block diagram of a network of data processing systems in which illustrative embodiments may be implemented.

The illustrative embodiments recognize that malicious actors are currently subverting the DNS protocol to exchange information between a server and a host. Particularly, the malicious actors setup a command and control server (C&C server) which behaves like a DNS server, infect a computer—the host, and establish communication over the DNS protocol between the C&C server and the infected host.

Stated another way, DNS Tunneling is a secondary result of a pre-infected host, and that a C&C server cannot, on its own, start tunneling into a targeted client—the host to be infected. Tunneling software has to be first installed on the client to complete the connection, which originates from malware. Once this malware has been installed, i.e., the host has been infected, the malware starts the process of establishing the DNS tunnel back to the C&C server.

Using this communication, the malicious actors cause data to be exfiltrated through this tunnel from the host to the C&C server and subsequently to the controller entities of the C&C server—the bot master. The tunnel established between a presumptive DNS server—the C&C server—and the infected host is a DNS tunnel, which operates according to the DNS protocol, and carries data packets that appear to be performing DNS communication.

The illustrative embodiments recognize that in a malicious operation, the malicious software sends specially crafted DNS queries to the C&C server. The DNS queries are constructed so as to cause undetected exfiltration of information from the infected host and other computers that may be accessible from the infected host in a data network.

Likewise, the illustrative embodiments recognize, specially crafted DNS responses from the C&C server to the infected host are employed to distribute instructions and data to the infected host. Thus, the illustrative embodiments recognize that the DNS tunnel is being operated to maliciously exfiltrate data from a network, introduce data or instructions into the network, create backdoors in the infected host or elsewhere in the network, obtain and reallocate trusted credentials of the infected host or users of the network, build detection avoidance into the host, deploy detection countermeasures, field test weaponized malware, and conduct many other such undesirable activities all under the guise of DNS communications.

The illustrative embodiments recognize that the DNS communication can be plain text or encrypted. Moreover, the illustrative embodiments recognize that there are malicious implementations where entire protocols—e.g., Secure Shell (SSH)—are being encapsulated and piggybacked onto DNS traffic.

The illustrative embodiments recognize that DNS communications are being exploited for malicious activities primarily because of the relatively open nature of DNS and the belief that the protocol is benign which leads traditional security practitioners to not police DNS communication as much as other communications under other types of protocols.

The illustrative embodiments further recognize that the tradecraft used by the malicious actors makes detecting malicious data exchange through DNS tunneling extremely difficult to detect. For example, techniques such as Domain Generation Algorithm (DGA) and Fast Flux render static or manual techniques for analysis and classification of DNS traffic useless for detecting malicious activity. As a result, the illustrative embodiments recognize that the current state of intrusion detection systems (IDS) or intrusion prevention systems (IPS) place little-to-no effort in analyzing DNS traffic as a potential threat to data security.

Thus, the illustrative embodiments recognize that presently, there exists little efficacy in the detection of malicious DNS traffic. What is needed is a cognitive method that can collect, analyze, classify and report where anomalous DNS traffic is being carried out in a given data network.

The illustrative embodiments used to describe the invention generally address and solve the above-described problems and other problems related to detecting malicious activity in DNS communications, alerting or notifying systems or personnel about such activity, collaborate with an IDS/IPS to add DNS traffic monitoring capability, to train or improve a cognitive detection engine described herein, or a combination thereof.

An embodiment can be implemented as a software application. The application implementing an embodiment can be configured as a modification of an existing system or application through which DNS requests and responses must pass in a network—referred to herein as a DNS resolver. The application implementing an embodiment can be configured as a modification of an existing IDS and/or IPS. The application implementing an embodiment can be configured as a separate application that operates in conjunction with an existing DNS resolver and/or IDS/IPS, a standalone application, or some combination thereof.

Generally, within the scope of the illustrative embodiments, a DNS resolver is any system or application that directly or indirectly participates in resolving a domain for a system or application within a given data network. A DNS resolver may be a dedicated hardware or software system, a system having other responsibilities—such as a proxy server, a networking component such as a switch, or some combination thereof.

An embodiment receives, collects, intercepts, or otherwise obtains, a DNS request from an infected host (host). Operating in a detection and notification mode, the embodiment allows the DNS request to pass to the C&C server (server).

An embodiment similarly receives, collects, intercepts, or otherwise obtains, a DNS response or answer (DNS response) from the server. Operating in a detection and notification mode, the embodiment allows the DNS response to pass to the host.

A detection and notification mode configures an embodiment to only detect malicious activity and notify a system, person, or authority about the activity. In this mode, an embodiment does not take preventative actions to prevent the malicious activity, thwart an attack, or generally put up a defense mechanism against an ongoing malicious activity or a future malicious activity. While the various operations of the various embodiments are described with respect to a detection and notification mode, an embodiment can be easily configured to actually defend against a malicious DNS tunneling activity. For example, via an adaptation of an embodiment, once a malicious DNS tunneling activity has been detected with sufficient certainty, the infected host can be shut down or taken offline; the offending C&C server can be added to a blocked list or dynamically tracked and blocked; an IDS/IPS function can be triggered for other actions; and so on.

These examples of the detection and notification mode or the possible adaptations for additional modes are not intended to be limiting. From this disclosure, those of ordinary skill in the art will be able to conceive many other operations, modes, and adaptations, and the same are contemplated within the scope of the illustrative embodiments.

From a DNS request packet or a DNS response packet, an embodiment extracts a set of one or more DNS protocol attributes. A DNS protocol attribute is a data field (field) or a record inside the packet, which is present in the packet according to the DNS protocol, which has a characteristic other than an actual value expressed by the contents of that field, and where the characteristic can be analyzed to determine DNS communication-specific information. Generally, a record can include one or more fields.

Some examples of a DNS packet attribute include but are not limited to an encoding or encryption used with the field, a length or size of the field, a category or type of characters expected in the field, an entropy of the field over several similar packets within a given period, a numerosity of the field in the packet, a numerosity of separate data elements in the field, a status of the field (e.g., requested domain resolved or unresolved), a state of the field (empty or populated), and the like.

A DNS protocol heuristic is a rule or logic implemented in code to determine whether a tested value satisfies a condition. A DNS protocol attribute heuristic (attribute heuristic) tests a DNS protocol attribute to determine whether the attribute is suspect for being used maliciously or whether the use of the attribute is indicative of benign or normal DNS communications.

Using a set of DNS protocol attribute heuristics, an embodiment determines whether an extracted attribute is indicative of malicious activity. For example, an example attribute may be the QNAME field of a DNS request which should be, as a no-limiting example, in clear text for benign DNS communications. Accordingly, an example attribute heuristic may be configured such that if encoding, such as Base64 encoding, or encryption, such as RC4 encryption is found in that field, the attribute heuristic identifies the attribute as being used maliciously.

Another example attribute may be the TXT field of a DNS request which should be, as a non-limiting example, less than 30 characters for benign DNS communications. Accordingly, an example attribute heuristic may be configured such that if data length greater than 30 bytes is found in that field, the attribute heuristic identifies the attribute as being used maliciously. Malicious DNS tunneling may try to get an entire file exfiltrated hundreds or thousands of bytes at a time using such fields.

Another example attribute may be the TXT field of a DNS request which should be, as a non-limiting example, include only alphanumeric characters for benign DNS communications. Accordingly, an example attribute heuristic may be configured such that if symbols other than alphanumeric characters are found in that field, the attribute heuristic identifies the attribute as being used maliciously. Malicious DNS tunneling may try to get a password, e.g., "pr@ttDNS.badguys.com", exfiltrated using such fields.

Another example attribute may be the QNAME field of a DNS request which should be, as a non-limiting example, not change more than a threshold number of times over a period from a host for benign DNS communications. Accordingly, an example attribute heuristic may be configured such that if entropy exceeding the threshold is found in that field, the attribute heuristic identifies the attribute as being used maliciously. Using such fields, malicious DNS tunneling may try to repeatedly send changing requests when DGA or Fast Flux tradecraft is in use, or when the infected host is trying to keep the tunnel open by sending repeatedly changing requests to the C&C server.

Another example attribute may be the Qclass extension field of a DNS request which should be, as a non-limiting example, only a two-byte field and should be blank because that field is mostly reserved in the protocol for future use. Accordingly, an example attribute heuristic may be configured such that if any data at all, or alternatively, data greater than two bytes in length is found in that field, the attribute heuristic identifies the attribute as being used maliciously. Malicious DNS tunneling may try to get a credential, e.g., a password or a certificate, exfiltrated using such fields, or may use the field for marshaling or signaling-type communication with the C&C server.

Other attribute heuristics can similarly be configured for encryption or encoding in CNAME and other attributes; length or size of CNAME, TX, or other fields; entropy in CNAME and other attributes, numerosity of "NXdomain" (domain not found response) or other values in a response field; a number of times the DNS server (C&C server in a malicious case) failed to resolve a requested domain; a change in a resolution of a requested domain over a period; and so on. Some attribute heuristics may use a field in a packet to make the determination. Some attribute heuristics may compute a trend of a field based on several packets over a period to make a determination. Some attribute heuristics may use a field from several packets from the same host or DNS client over a period to make a determination. Some attribute heuristics may use a field from several packets from several DNS clients over a period to make a determination. Some attribute heuristics may use a field from several packets from the same DNS server over a period to make a determination.

These examples of attribute heuristics and attributes are not intended to be limiting. From this disclosure, those of ordinary skill in the art will be able to conceive many other attributes and their corresponding attribute heuristics, and the same are contemplated within the scope of the illustrative embodiments.

From a DNS request packet or a DNS response packet, an embodiment extracts a set of one or more DNS traffic parameters. A DNS traffic parameter is a value associated with a DNS communication occurring between a DNS client and a DNS server according to the DNS protocol, which has a characteristic other than an actual value expressed by the contents of any field in any packet being communicated, and where the characteristic can be analyzed to determine DNS communication-specific information. Some examples of a DNS traffic parameters include but are not limited to a number of transmissions of a certain type of packet, field, request or specific data therein, response or specific data therein; volume of transmissions to a particular Internet Protocol (IP) address or about a particular domain; a frequency of transmission to or from a server, or about a domain; and the like.

A DNS protocol traffic heuristic (traffic heuristic) tests a DNS protocol traffic parameter to determine whether the parameter is indicative of malicious use of a DNS tunnel or whether the parameter indicates benign or normal DNS communications.

Using a set of DNS protocol traffic heuristics, an embodiment determines whether a traffic parameter extracted or computed for a given DNS communication over a period is indicative of malicious activity. For example, an example parameter may be a number of times TXT resource record (RR) is transmitted to an IP address or domain name which should not exceed a threshold for benign DNS communications. Accordingly, an example traffic heuristic may be configured such that if number of times TXT RR is transmitted in a DNS communication is found to exceed the threshold, the traffic heuristic identifies the DNS communication as malicious.

Another example traffic parameter may be the frequency (number of times per period) of transmission of TXT RR which should be below a threshold frequency for benign DNS communications. Accordingly, an example traffic heuristic may be configured such that if the transmission frequency of TXT RR exceeds the threshold over a specified period, the traffic heuristic identifies the DNS communication as malicious.

Another example traffic parameter may be the volume, frequency, or both, of DNS communication traffic to or from a particular IP address or domain, which should be below their respective thresholds for benign DNS communications. Accordingly, an example traffic heuristic may be configured such that if the volume, frequency, or both, of DNS communication traffic to or from a particular IP address or domain exceed their respective thresholds, the traffic heuristic identifies the DNS communication as malicious.

Another example traffic parameter may be the frequency of transmission of CNAME and/or TXT RR from an IP address or domain name of a server to an infected host. An example traffic heuristic may be configured such that if the transmission frequency exceeds a threshold over a specified period, the traffic heuristic identifies the DNS communication as malicious.

Other traffic heuristics can similarly be configured for measuring the numbers of transmissions, frequencies of transmissions, timings of transmissions, patterns of transmissions, of an attribute, set of attributes, packets, or types of packets, and so on. Some traffic heuristics may use a field in a packet to make the determination. Some traffic heuristics may compute a trend of a field based on several packets over a period to make a determination. Some traffic heuristics may use a field from several packets from the same host or DNS client over a period to make a determination. Some traffic heuristics may use a field from several packets from several DNS clients over a period to make a determination. Some traffic heuristics may use a field from several packets from the same DNS server over a period to make a determination.

These examples of traffic heuristics and attributes are not intended to be limiting. From this disclosure, those of ordinary skill in the art will be able to conceive many other traffic parameters and their corresponding traffic heuristics, and the same are contemplated within the scope of the illustrative embodiments.

An embodiment can also cross-correlate the attributes and/or payload data of a DNS request packet or a DNS response packet, with externally available information from third parties. For example, a third-party data source can provide domain names or IP addresses known to employ DGA, Fast Fluxing, or other tradecraft generally, to exfiltrate information using other protocols or methods.

As an example, an embodiment can employ an existing adaptive profiling method for DGA detection for examining the contents of a DNS packet or a field therein. Using the adaptive profiling method for DGA detection, the embodiment determines whether a DNS packet or a field therein is carrying DGA malware or a result thereof. For example, using this method, the embodiment can detect that for a greater than a threshold number of times (e.g., exceeding ninety-nine percent of the times) when the host sends a DNS request (also called "beaconing out"), the server fails to resolve the requested domain when the server responds (also called "beaconing"), giving rise to the suspicion that DGA malware may be active.

As a secondary determination from this finding, the embodiment can choose to examine attributes of a DNS packet or the parameters of the DNS traffic to determine whether data is being exfiltrated or other malicious activity indicators are present in the packet or traffic as described herein.

As another example, an embodiment can receive blacklists of servers, domains, or IP addresses from a third-party data source. An embodiment can also be adapted to execute predictive blacklisting to DNS traffic, as is applied to traffic of other protocols. For example, the embodiment can perform predictive blacklisting based on the contents of TXT and/or CNAME payloads in DNS packets.

These examples of cross-correlation methods are not intended to be limiting. From this disclosure, those of ordinary skill in the art will be able to adapt an embodiment for using many other DNS attributes, traffic parameters, and third-party resources, using which cross-correlation in DNS traffic can be performed for a similar purpose. Such adaptations of the illustrative embodiments are contemplated within the scope of the illustrative embodiments.

From a DNS request packet or a DNS response packet, an embodiment extracts a payload. A payload is an actual value expressed by the contents of a field or attribute in a record of a DNS packet being communicated, and where the value can be analyzed at a time of the communication to determine whether a malicious intent exists behind communicating that value in that field in that DNS packet in that DNS communication from that infected host at that time in the data network. Some examples of a payloads of a DNS packet include but are not limited to a content carried in a field of the TXT record, a field of the CNAME record, a field of the QNAME record, and generally a field of any record of a DNS packet which can be used to carry textual data of length sufficient for Natural Language Processing (NLP).

Natural Language is written or spoken language having a form that is employed by humans for primarily communicating with other humans or with systems having a natural language interface. NLP is a technique that facilitates exchange of information between humans and data processing systems. For example, one branch of NLP pertains to transforming human readable content into machine usable data. For example, NLP engines are presently usable to accept input content such as a newspaper article or a whitepaper, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is the branch of cognitive analytics, where available natural language information or knowledge is analyzed to create, infer, deduce, or derive new information.

Shallow parsing is a term used to describe lexical parsing of a given content using NLP. For example, given a sentence, an NLP engine determining what the sentence semantically means according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or some corpora.

Using an NLP engine, the embodiment parses the payload data into one or more term vectors. A term vector is an array, set, or collection of several words, and includes a specific word. The specific word is referred to herein as a "term". For example, a term vector may be a sentence, paragraph, or generally any other identified portion of a given textual data.

An embodiment uses a recurrent neural network (RNN) to determine a class, co-reference, and an entity of the term with a corresponding confidence value. A class is a classification of the term for maliciousness given the term vector from the payload. A co-reference is another way the term is represented in the term vector, the payload, or a collection of payloads. An entity is a type of object the term represents. As a non-limiting example, the classes can be benign, suspicious, or malicious. As a non-limiting example, the co-reference for a proper noun is a pronoun used in the term vector, the payload, or a collection of payloads. A term can have any number of co-references. An entity for an example person named "Sarah" in a given term vector can a human female (or a code word for a function, depending on the term vector). There can be cases where a term can have multiple entities. Accordingly, a term can be benign in one occurrence, vector, or payload, and malicious in another occurrence, vector, or payload.

Furthermore, an embodiment can select a term vector from a single payload of a single DNS packet and analyze the term vector in view of that single payload, or can select a term vector from a single payload of a single DNS packet but analyze the term vector in view of payloads collected from multiple packets over a period. In one embodiment, the term vector is selected based on some context or contextual window defined around a term of interest. For example, an administrator may set the context, a size of window, or both in order to select a term vector from a payload.

Assume as a non-limiting example, suppose that the term vector is a sentence, "Sarah was playing when she kicked the ball" where the term is "she". An objective of the embodiment is to determine whether the term "she" in the given vector, and therefore in the given payload, is of the example benign class (benign some confidence value), the example suspicious class (suspicious for maliciousness with some confidence value), or of the example malicious class (decidedly malicious with some confidence value). Another objective is to determine what is meant by "she"—i.e., what is the entity type of "she" and is "she" a code for something or a co-reference of Sarah.

These examples of classes and confidence values are not intended to be limiting. From this disclosure, those of ordinary skill in the art will be able to conceive an arbitrary number or types of classes for classification with various corresponding confidence values, and the same are contemplated within the scope of the illustrative embodiments.

Using a previously trained neural network function, the embodiment decomposes the term vector into a function Wa. Function Wa outputs, for the input term vector, a set of weights for a corresponding set of nodes in the RNN. The weights from the set of weights when applied to the corresponding nodes from the set of nodes of the RNN produce one or more classes and corresponding one or more confidence values, one or more co-references, and one or more entities, that represent the term in the vector based on one or more payloads depending on the training set.

Using another previously trained neural network function, another embodiment decomposes the term vector into a function Wb. Function Wb outputs, for the input term vector, a set of weights for a corresponding set of nodes in the RNN. The weights from the set of weights when applied to the corresponding nodes from the set of nodes of the RNN produce one or more Cartesian distance between co-occurrences of the term in the payload along with corresponding one or more confidence values that the Cartesian distance is alarming for maliciousness or benign in a general DNS communication.

Co-occurrence is a repeat occurrence or another occurrence of the term. The co-occurrence can be within a given payload. In some cases, the Cartesian distance can also be measured across multiple payloads, to wit, a distance between one occurrence in one payload and another occurrence in another payload.

Thus, various embodiments can analyze the attributes, traffic parameters, and/or payloads of DNS traffic in different manners to determine the existence, classification, and confidence in the classification of malicious activity in DNS traffic. Optionally, metadata can be collected or computed from the payload or payloads to support the detection, classification, and confidence. An embodiment further uses previous detections, classifications, confidence values, and supporting metadata in a deep learning system to adjust a heuristic or train the RNN.

Optionally, a classified detection, the corresponding confidence value, and the supporting metadata can be further treated for error correction. For example, the classification, the confidence value, and the supporting metadata of a detected malicious activity can be supplied to an error correcting model, e.g., a Naïve Bayes algorithm-based model. The error correcting model removes any false positives according to the model's programing, and outputs classification, confidence value, and supporting metadata of a higher reliability than the input classification, confidence value, and supporting metadata.

A method of an embodiment described herein, when implemented to execute on a device or data processing system, comprises substantial advancement of the functionality of that device or data processing system in detecting malicious activity in DNS communications. For example, presently available methods for detecting malicious exchange of data is unable to address the data exfiltration via DNS communication, which is highly dynamic due to the tradecraft used with C&C DNS servers. An embodiment provides a method by which the attributes of one or more DNS packets are analyzed to detect and classify malicious activity. Another embodiment provides a method by which the DNS traffic parameters of one or more DNS packets in one or more DNS communications are analyzed to detect and classify malicious activity. Another embodiment provides a method by which the DNS attributes, the DNS traffic parameters, the DNS payload, or a combination thereof are analyzed using third-party data or detection tools used with other protocols to detect and classify malicious activity in DNS communications. Another embodiment provides a method by which the DNS packet payloads of one or more DNS packets are subjected to cognitive analytics to detect and classify malicious activity in DNS communications. This manner of cognitive and contextual detection of malicious DNS tunneling is unavailable in the presently available methods. Thus, a substantial advancement of such devices or data processing systems by executing a method of an embodiment is in more effective policing of data exfiltration and other malicious activity in a data network particularly by detecting threats posed by malicious DNS communications.

The illustrative embodiments are described with respect to certain types of DNS communications, DNS packets, DNS servers, DNS protocol, DNS attributes, DNS traffic parameters, DNS payload, heuristics, cognitive analytics, third-party data and tools, classifications, confidence values, algorithms, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
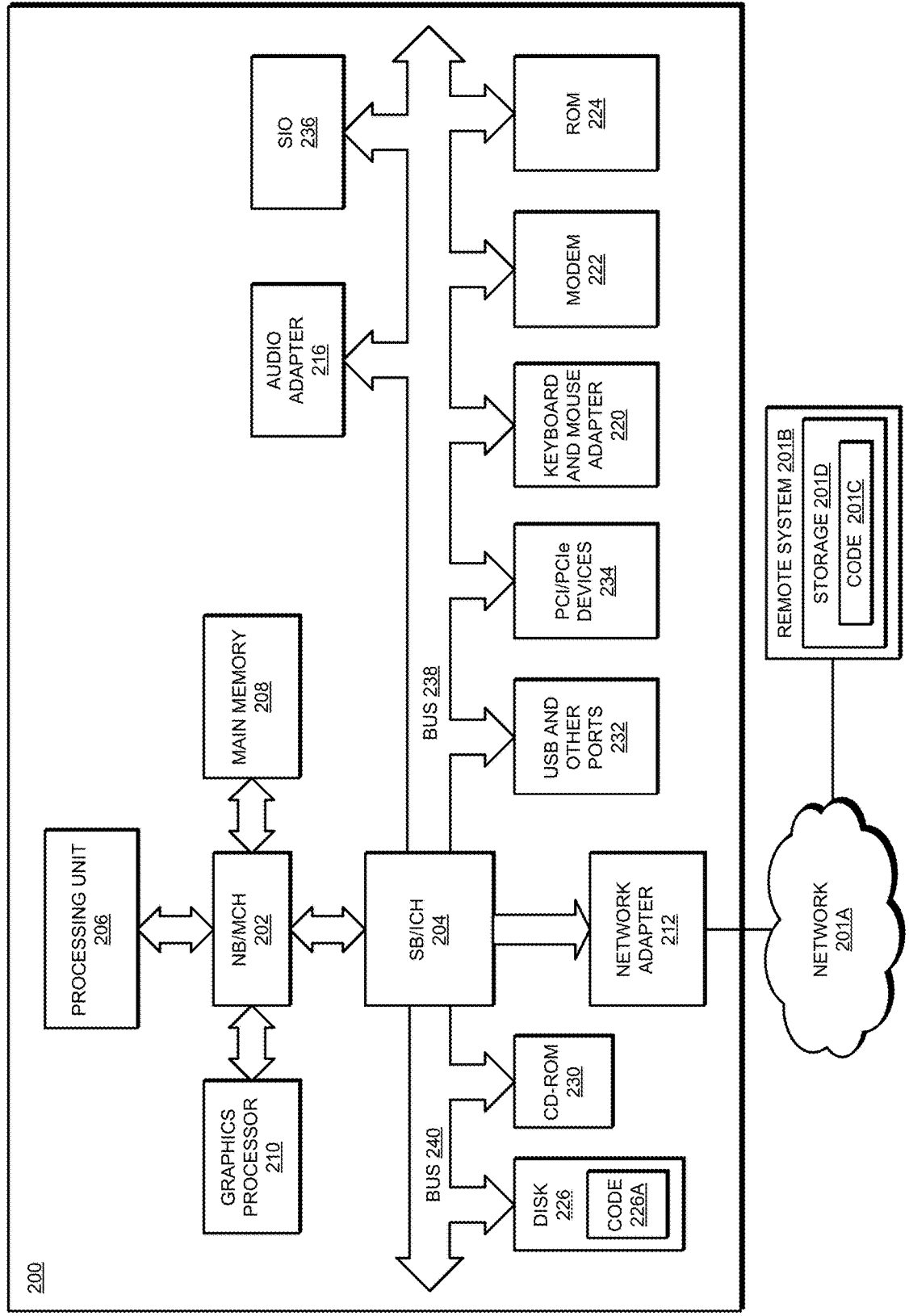
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. DNS tunneling malware 107 establishes a DNS tunnel through network 102—e.g., a LAN, over network 103A—e.g. Internet, to C&C server 103B which is operating malicious DNS server code 103C. Data local to host 106 or elsewhere on network 102—e.g., data 109—can be passed from infected host 106 through such a DNS tunnel, eventually reaching malicious bot master 103D. Bot master can also 103D control C&C server 103B to send instructions or commands to infected host 106. DNS tunneling malware 113 on client 112 and 134 on device 132 can operate in a similar manner as DNS tunneling malware 107 on infected host 106, making client 112 and device 132 infected hosts as well.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN).

FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
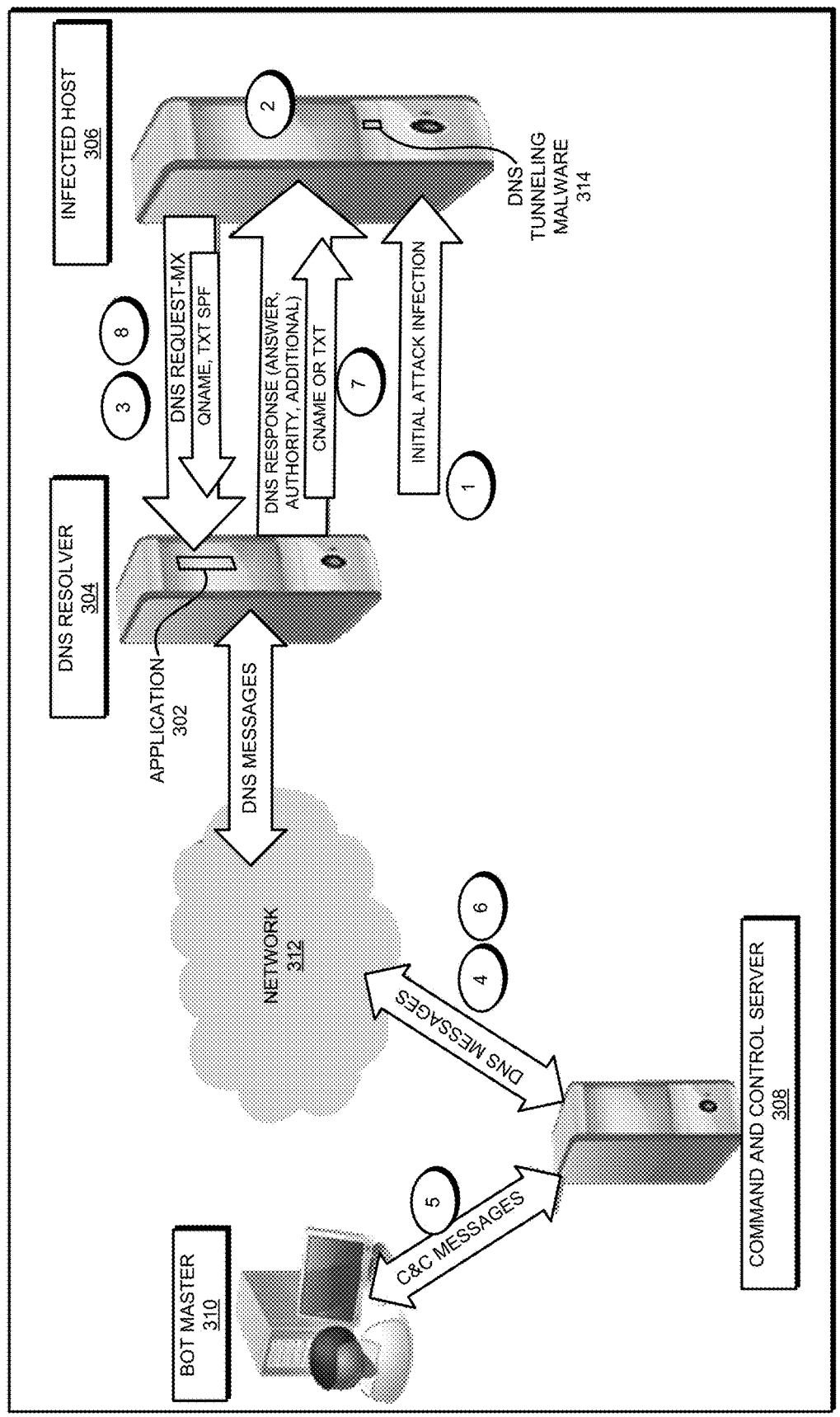
FIG. 3 depicts a block diagram of an example configuration for cognitive and contextual detection of malicious DNS tunneling in accordance with an illustrative embodiment.

With reference to FIG. 3, this figure depicts a block diagram of an example configuration for cognitive and contextual detection of malicious DNS tunneling in accordance with an illustrative embodiment. Application 302 is an example of application 105 in FIG. 1. DNS resolver 304 is an example of server 104 in FIG. 1. Infected host 306 is an example of server 106 in FIG. 1. C&C server 308 is an example of C&C server 103B in FIG. 1. Bot master 310 is an example of bot master 103D in FIG. 1. Network 312 is an example of network 103A in FIG. 1.

Depicted in FIG. 3 is a non-limiting example sequence of data communication operations that are commonly performed in establishing and operating a malicious DNS tunnel. Operation 1 is the initial attack on host 306 which is to be infected. In operation 1, DNS tunneling malware 314 is inserted into the data processing environment of host 306 and installed on host 306, making host 306 an infected host.

In operation 2, tunneling malware 314 gathers the credentials from host 306, performs other mapping or scanning activities, or both. In operation 3, tunneling malware 314 initiates a DNS tunnel creation and connects to C&C server 308 in a "phone home" manner. The tunnel creation may appear as routine DNS traffic, such as a DNS request (MX) to C&C server 308 using the SPF TXT Resource Record or QNAME for payload. The record may be clear text, encoded, or encrypted as described herein. For example, the message in operation 3 may include QNAME "Passwd=1234.badguys.com".

Application 302 executing in DNS resolver 304 analyzes an attribute of the QNAME or TXT record, the DNS traffic containing the message of operation 3, the payload of QNAME or TXT record, or some combination thereof in a manner described herein. Application 302 allows the DNS message of operation 3 to pass to network 312 for delivery at C&C server 308. C&C server 308 receives the "phone home" DNS message of operation 3 in operation 4. C&C server 308 has thus received exfiltrated credentials information of the example described above.

The credentials and other information about the DNS tunnel are passed from C&C server 308 to bot master 310 in operation 5. Bot master 310 instructs C&C server 308 in operation 5 to take some action with infected host 306, e.g., to transmit a command or instruction to tunneling malware 314.

C&C server 308 transmits the command or instruction to tunneling malware 314 in operation 6. Application 302 executing in DNS resolver 304 analyzes an attribute, a DNS traffic parameter, a payload, or some combination thereof of the DNS response from C&C server 308 in a manner described herein. Application 302 allows the DNS response of operation 6 to pass to infected host 306 in operation 7.

As a non-limiting example, assume that the DNS response from operation 6 has the instructions embedded in the CNAME or TXT record. Again such embedding may be in clear text or may be encoded or encrypted as described herein.

As a non-limiting example, in operation 8, tunneling malware 314 exfiltrates data, e.g., in the payload of QNAME and/or TXT records of more DNS requests, to C&C server 308. such exfiltration may be in clear text or may be encoded or encrypted as described herein. Alternatively, or additionally, the instructions may cause tunneling malware to cause an operation at infected host 306. Eventually, some DNS messaging in the form of a DNS request of operation 8 occurs from infected host 306 to C&C server 308.

Figure 4A:
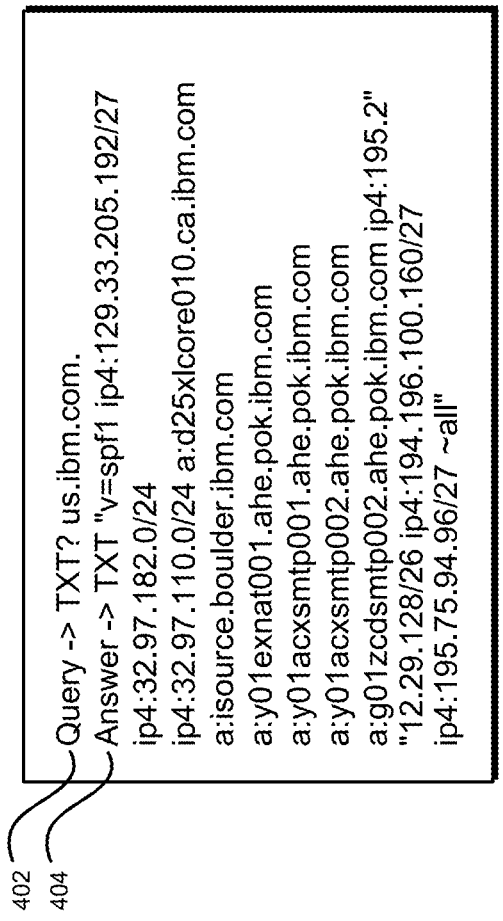
FIG. 4A depicts example DNS request and response which are classified as benign DNS traffic in accordance with an illustrative embodiment.

With reference to FIG. 4A, this figure depicts example DNS request and response which are classified as benign DNS traffic in accordance with an illustrative embodiment. Application 302 in FIG. 3 can be used to determine the benign classification of query 402 of the DNS request and answer 404 of the DNS response.

Query 402 depicts an example legitimate DNS domain resolution query that might originate within an intranet. The DNS protocol specification allows for numerous RRs in answer 404, such as a record of the resolved address for the domain in the query, records of one or more authorities providing that name resolution, and records of one or more additional sources of information about the requested domain name.

Figure 4B:
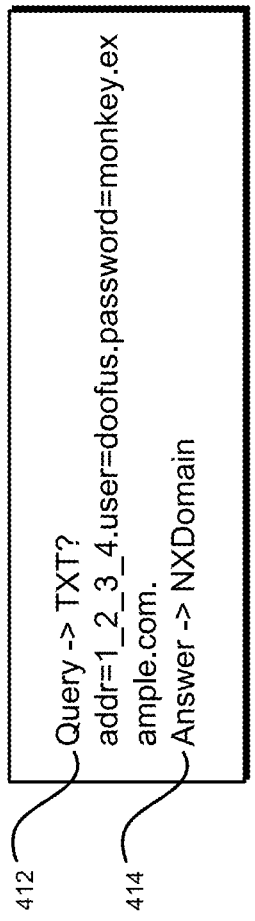
FIG. 4B depicts example DNS request and response which are classified as malicious DNS traffic with some degree of confidence in accordance with an illustrative embodiment.

With reference to FIG. 4B, this figure depicts example DNS request and response which are classified as malicious DNS traffic with some degree of confidence in accordance with an illustrative embodiment. Application 302 in FIG. 3 can be used to determine the benign classification of query 412 of the DNS request and answer 414 of the DNS response.

A transaction that mimics SPF but in reality exfiltrates information to the authoritative DNS server in the example-.com domain looks like query 412. Query 412 depicts an example malicious DNS domain resolution query designed for data exfiltration. The presence of the word "password", the "=" symbol, the length of the query, and other features of query 412 are analyzed by application 302 as described herein to classify query 412 as malicious. The answer is irrelevant; the information has been exfiltrated since the query is necessarily forwarded to the Authoritative Domain Name Server (ADNS). The NXDomain response in answer 414, is also an indication that the domain of the query did not resolve and that the query might be suspicious for reasons described earlier. For example, a volume of NXDomain responses may exceed a threshold, a frequency of NXDomain responses may exceed a threshold, and so on, for application 302 to deem the response suspicious.

Figure 4C:
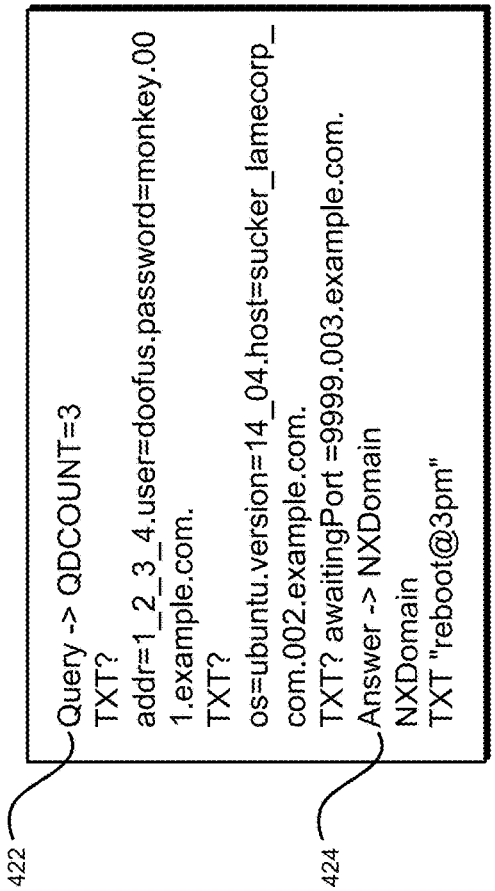
FIG. 4C depicts example DNS request and response which are classified as malicious DNS traffic with some degree of confidence in accordance with an illustrative embodiment.

With reference to FIG. 4C, this figure depicts example DNS request and response which are classified as malicious DNS traffic with some degree of confidence in accordance with an illustrative embodiment. Application 302 in FIG. 3 can be used to determine the benign classification of query 422 of the DNS request and answer 424 of the DNS response.

Multiple objects may be requested in a single DNS transaction. Since the payload is in the query, this allows for arbitrary lengths in the exfiltration payload. Additional since DNS response caching is done on the entire object, the uniqueness guarantees that the entire transaction will be transmitted to the ADNS, which is the C&C server. The example in this figure is using a sequential counter to rearrange the message order.

Again, example query 422 is a malicious DNS domain resolution query designed for data exfiltration in a manner similar to query 412 of FIG. 4B. Here, the amount of data being exfiltrated is larger. Furthermore, not only is the credential data being exfiltrated in query 422, a tunneling malware in the infected host is also passing other information to the C&C server, which the C&C server can use for malicious purposes.

In example DNS communication, an arbitrary number of tokens have been passed, and upon receipt of final response message, an order to reboot was received at the infected host. For example, the C&C server is providing a reboot instruction to the tunneling malware in answer 424, which will cause an unexpected reboot of the infected host. The NXDomain responses in answer 424 is also an indication that the domain of the query did not resolve and that the query might be suspicious for additional reasons described earlier.

Figure 4D:
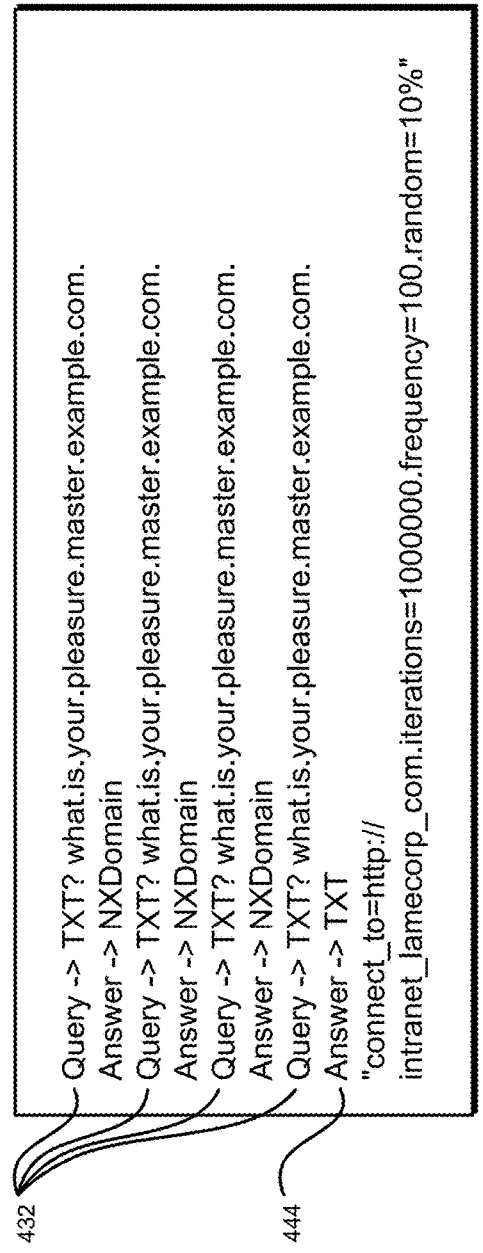
FIG. 4D depicts example DNS request and response which are classified as malicious DNS traffic with some degree of confidence in accordance with an illustrative embodiment.

With reference to FIG. 4D, this figure depicts example DNS request and response which are classified as malicious DNS traffic with some degree of confidence in accordance with an illustrative embodiment. Application 302 in FIG. 3 can be used to determine the benign classification of query 432 of the DNS request and answer 434 of the DNS response.

FIG. 4C showed by example that it is possible to transmit orders to infected clients via replies made to queries. Even if it is not possible for a DNS server, such as a C&C server, to initiate DNS communications with a DNS client, it is possible for DNS servers to delay replies for an amount of time. Consequently, if an infected client keeps making a request to a server, the communication channel—the DNS tunnel—remains open. This type of DNS communication is called beaconing, whereby the client beacons out and the server beacons in.

Example query 432 made repeatedly keeps the DNS tunnel open. Delayed answer 434 directs the infected host to make 1,000,000 queries every 100 seconds +/−10% to intranet.lamecorp.com. Repeated query 432 and delayed answer 434 can be analyzed in application 302 in a manner described herein to classify query 432 and answer 434 are malicious.

Figure 5:
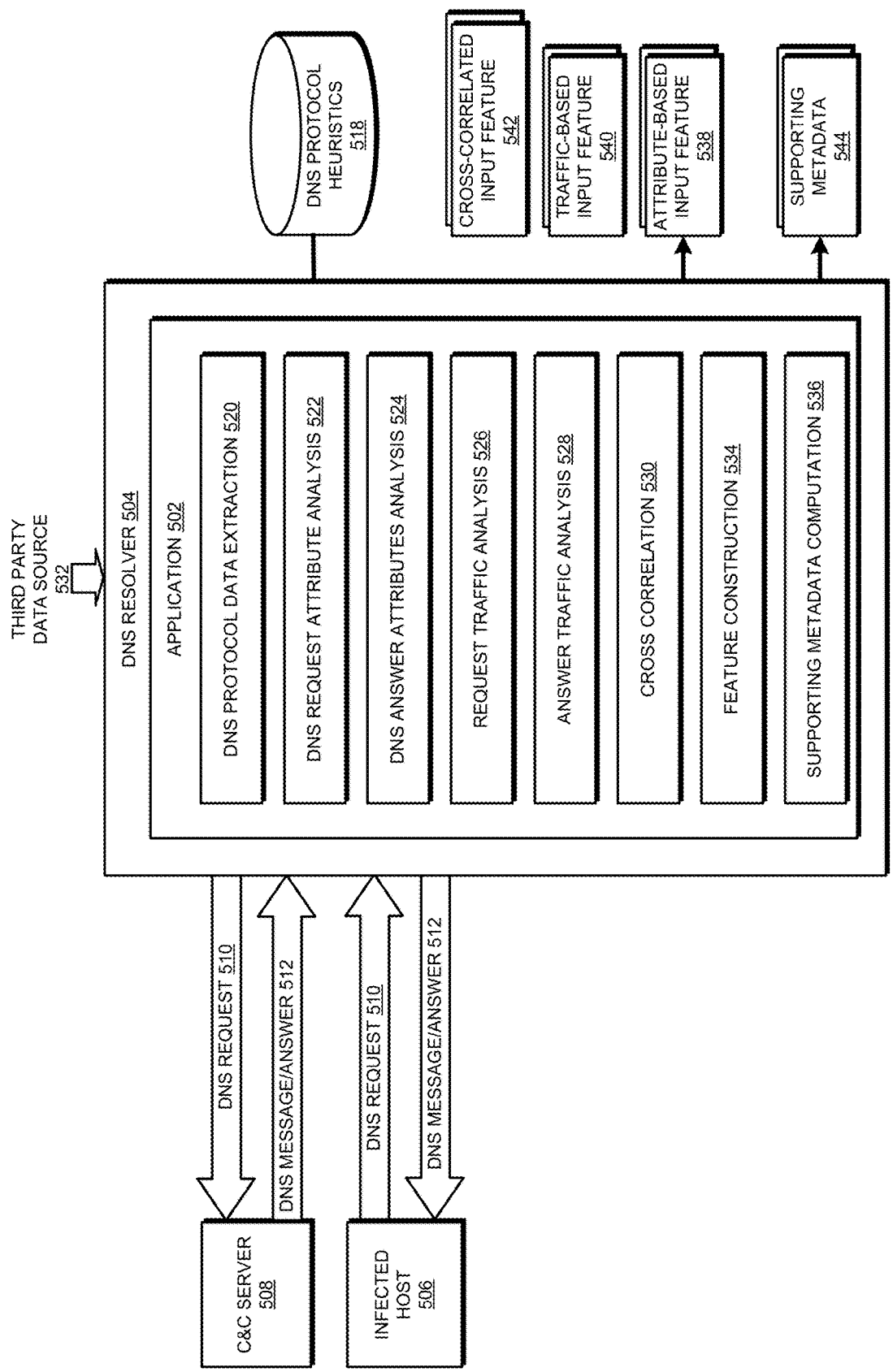
FIG. 5 depicts a block diagram of a configuration for cognitive and contextual detection of malicious DNS tunneling in accordance with an illustrative embodiment.

With reference to FIG. 5, this figure depicts a block diagram of a configuration for cognitive and contextual detection of malicious DNS tunneling in accordance with an illustrative embodiment. Application 502 is an example of application 302, DNS resolver 504 is an example of DNS resolver 304, infected host 506 is an example of infected host 306, and C&C server 508 is an example of C&C server 308, respectively, in FIG. 3.

Infected host 506 sends DNS request 510 to C&C server 508. Request 510 reaches application 502 in DNS resolver 504. Application 502 allows request 510 to proceed to C&C server 508. C&C server 508 sends DNS response 512 to infected host 506. response 512 reaches application 502 in DNS resolver 504. Application 502 allows response 512 to proceed to infected host 506.

From request 510, response 512, or both, component 520 extracts DNS protocol data. The extracted DNS protocol data can take the form of one or more DNS packet attributes, one or more DNS traffic parameters, or one or more payloads as described herein.

Repository 518 of DNS protocol heuristics provides one or more attribute heuristics, traffic heuristics, heuristics for cross-correlation, or some combination thereof. Component 522 analyzes a DNS request attribute using an attribute heuristic from repository 518 as described herein. Component 524 analyzes a DNS answer attribute using an attribute heuristic from repository 518 as described herein.

Component 526 analyzes a DNS request traffic parameter using a traffic heuristic from repository 518 as described herein. Component 528 analyzes a DNS answer traffic parameter using a traffic heuristic from repository 518 as described herein.

Component 530 cross-correlates a protocol attribute, a traffic parameter, or a payload of a record in request 510 or response 512, with data or tool provided by third-party source 532. As a non-limiting example, source 532 may be a source of reverse DNS to geolocation and/or country mapping information, which component 530 uses to compute a location or country entropy for predictive blacklisting. As a non-limiting example, source 532 may be a source of date of registration information, registrar information, administrative contacts, WHOIS information, and so on, which component 530 uses to filter out fast fluxing domains for predictive blacklisting.

Component 534 constructs a feature from the analyzed attribute, parameter, or cross-correlated DNS communication data of any type. A feature in an input of a form that is consumable in a deep learning system for training an RNN. For example, an attribute-based input feature 538 results from one or more analyzed DNS protocol attribute, a traffic-based input feature 540 results from one or more analyzed DNS traffic parameter, and a cross-correlated input feature 542 results from one or more pieces of cross-correlated DNS communication data.

Features 538, 540, and 542 that are based on request 510 are beaconing out features. Features 538, 540, and 542 that are based on response 512 are beaconing in features. Component 536 optionally produces supporting metadata 544 for one or more of the input features 538, 540, and 542, from the DNS communication data reaching application 502. In one embodiment, supporting metadata 544 includes a count of occurrences of a feature, a frequency of occurrence of a feature, or a combination thereof, to support the extraction of the feature.

Figure 6:
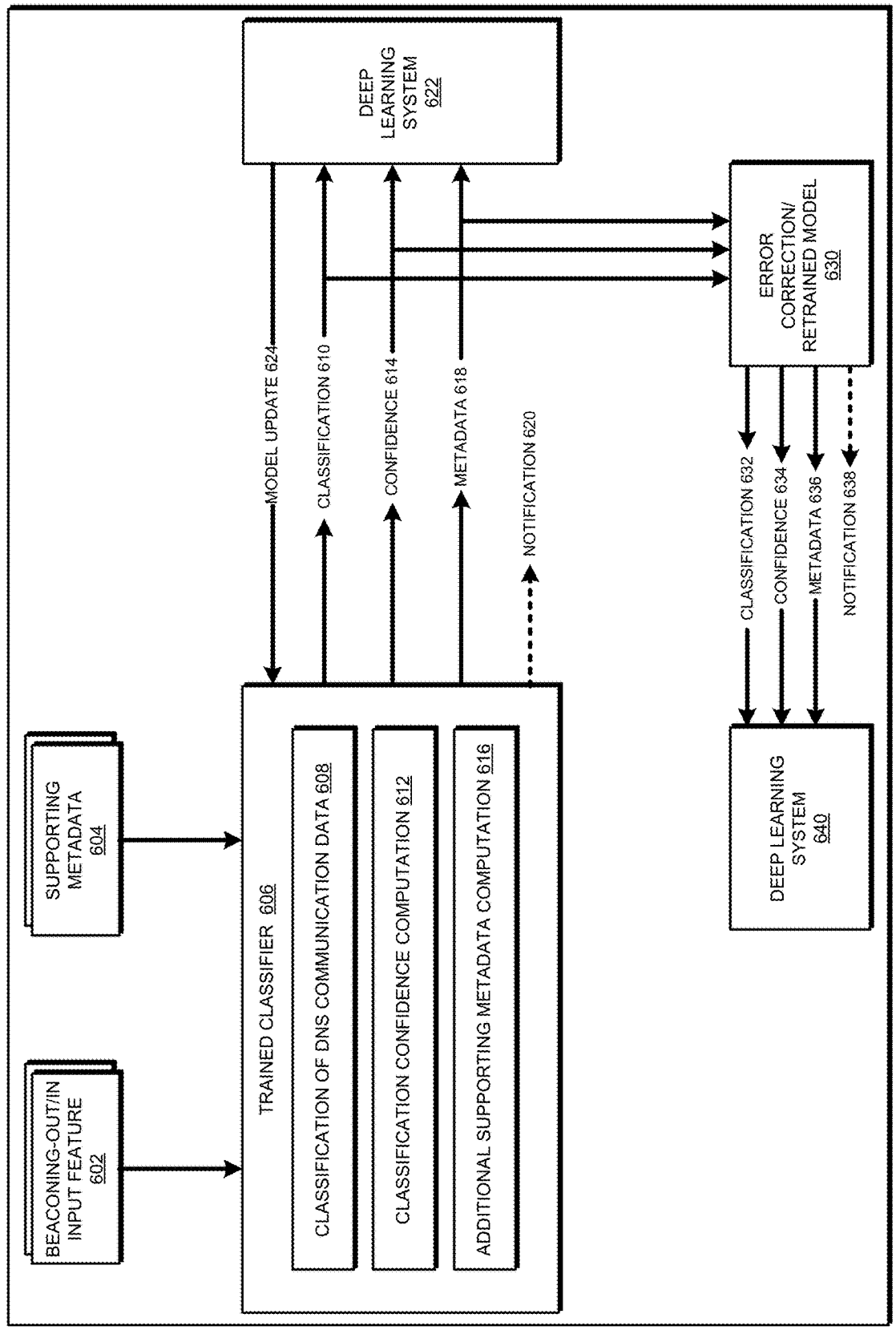
FIG. 6 depicts a block diagram of a configuration for classification of DNS communication features in accordance with an illustrative embodiment.

With reference to FIG. 6, this figure depicts a block diagram of a configuration for classification of DNS communication features in accordance with an illustrative embodiment. Input feature 602 can be any one or more of input features 538, 540, or 542 in FIG. 5. Support metadata 604 is the metadata from support metadata 544 of FIG. 5 that supports input feature 602.

Trained classifier 606 can be a heuristics-based classifier, RNN-based classifier or a combination thereof. Furthermore, trained classifier 606 can be implemented as a part of application 502 in FIG. 5, or as a separate application that operates in conjunction with application 502, on the same or a different machine as application 502.

Using input feature 602 and metadata 604, component 608 outputs classification 610 of the DNS communication from which the feature was created. In a simple non-limiting example, component 608 may classify the DNS communication as benign or malicious. Of course, those of ordinary skill in the art can adapt component 608 to produce more or different classifications, and such adaptations are contemplated within the scope of the illustrative embodiments.

Component 612 outputs confidence value 614 corresponding to classification 610. Component 616 optionally computes additional supporting metadata 618 in support of classification 610 and confidence 614.

As an example, if classification 610 is "malicious", and confidence 614 is "0.6" or 60 percent, the DNS communication is suspicious rather than decidedly malicious relative to a threshold confidence value of 0.75, and might have to be further reviewed for maliciousness by an administrator user or system. As another example, if classification 610 is "malicious", and confidence 614 is "0.9" or 90 percent, the DNS communication is decidedly malicious relative to the threshold confidence value of 0.75, and might have to be acted upon immediately by an administrator user or system.

Optionally, trained classifier 606 may output notification 620 for an administrator user or system. Notification 620 communicates classification 610, confidence 614, and metadata 618 when available, for a given DNS communication.

Responsive to notification 620, the administrator user or system can act to disrupt a malicious DNS communication immediately or further review the suspected DNS communication, as the case may be.

One embodiment stops further classification activities if notification 620 is deemed reliable through sufficient training of trained classifier 606. Classification 610, confidence 614, and additional metadata 618—such as count or frequency of feature occurrences, are provided to deep learning system 622. Deep learning system 622 trains or retrains an RNN through continuous learning for classifying features into the maliciousness classes with corresponding confidence values. Where trained classifier 606 is an RNN, deep learning system 622 provides retrained or increasingly trained RNN via model update 624 to trained classifier 606.

Classification 610, confidence 614, and metadata 618 can be prone to false positives (of maliciousness) at this level of classification by trained classifier 606. Accordingly, notification 620, if produced, can be prone to false positives (of maliciousness) at this level of classification by trained classifier 606.

Therefore, one embodiment further provides classification 610, confidence 614, and metadata 618 as inputs to error correction model 630. Error correction model 630 can be based on a separate error correction algorithm or false positive elimination algorithm, such as Naïve Bayes algorithm without implying a limitation thereto. Error correction model 630 can also be based on a differently trained RNN model for cross-checking or validating a previous classification.

Error correction model 630 produces error-corrected classification 632, corresponding confidence value 634, and supporting metadata 636—such as count or frequency of feature occurrences. Error-corrected notification 638 has a lower likelihood of false positives than notification 620.

Again, the outputs of error correction model 630 can be used for continuous learning. Therefore, one embodiment further provides classification 632, confidence 634, and metadata 636—such as count or frequency of feature occurrences, to deep learning system 640. Deep learning system 640 may be the same as deep learning system 622 and may train or retrain the RNN of trained classifier 606. Deep learning system 640 may be different from deep learning system 622 and may train or retrain the RNN of error correction model 630. Deep learning system 640 analyzes detected malicious and/or abnormal activities and correlates and classifies them into specific tradecraft characterization for not only initial classification also to characterize how Botnet command and control agents adapt their tradecraft over time, such as to defeat defense measures. These newly adapted tradecraft measures have a direct correlation with input feature precedence and cause changes to model-heuristic training 630, 538, 540, 542, classification, and scoring.

Figure 7:
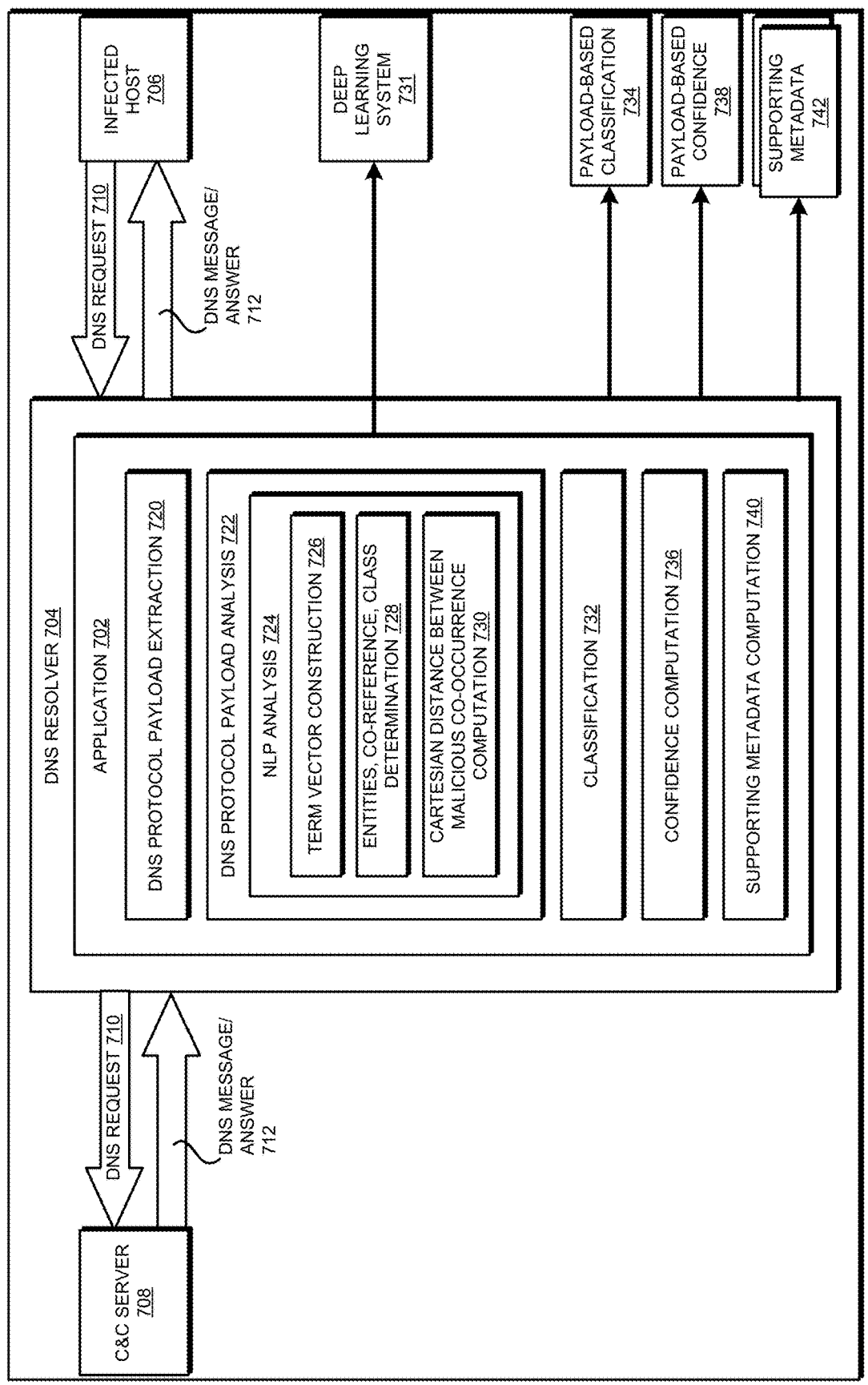
FIG. 7 depicts a block diagram of an example configuration for payload-based classification of malicious DNS communications in accordance with an illustrative embodiment.

With reference to FIG. 7, this figure depicts a block diagram of an example configuration for payload-based classification of malicious DNS communications in accordance with an illustrative embodiment. Application 702 is an example of application 502 with the additional features described herein. DNS resolver 704 is an example of DNS resolver 504, infected host 706 is an example of infected host 506, and C&C server 708 is an example of C&C server 508, respectively, in FIG. 5. DNS request 710 and DNS response 712 operate in a manner similar to DNS request 510 and DNS response 512 in FIG. 5.

Component 720 extracts payload data from a record in the DNS protocol packet of request 710, response 712, or both. Component 722 analyzes the payload through NLP analysis 724.

Specifically, in a manner described herein, component 726 constructs a term vector for a term of interest found in the payload. Component 728 configures an RNN with weights according to function Wa and determines an entity, co-reference, and class of the term. Component 730 configures an RNN with weights according to function Wb and determines a Cartesian distance between co-occurrences of the term.

In one embodiment, only component 728 is used in NLP analysis 724 for DNS communication classification. In another embodiment, only component 730 is used in NLP analysis 724 for DNS communication classification. In another embodiment, components 728 and 730 are both used in NLP analysis 724 for DNS communication classification. An RNN used by component 728, an RNN used by component 730, or both, are trained, retrained, and provided by deep learning system 731.

Component outputs payload-based classification 734 of the DNS communication, e.g., DNS request 510, DNS response 512, or both, based on the class computed by component 728, co-occurrence distance computed by component 730, or both. Component 736 outputs confidence 738 in classification 734. Optionally, component 740 outputs if any supporting metadata 742—such as numerosity of co-references or entities, count of co-occurrences or Cartesian distances between co-occurrences, or some combination thereof—which can be computed from the payload analysis.

Figure 8A:
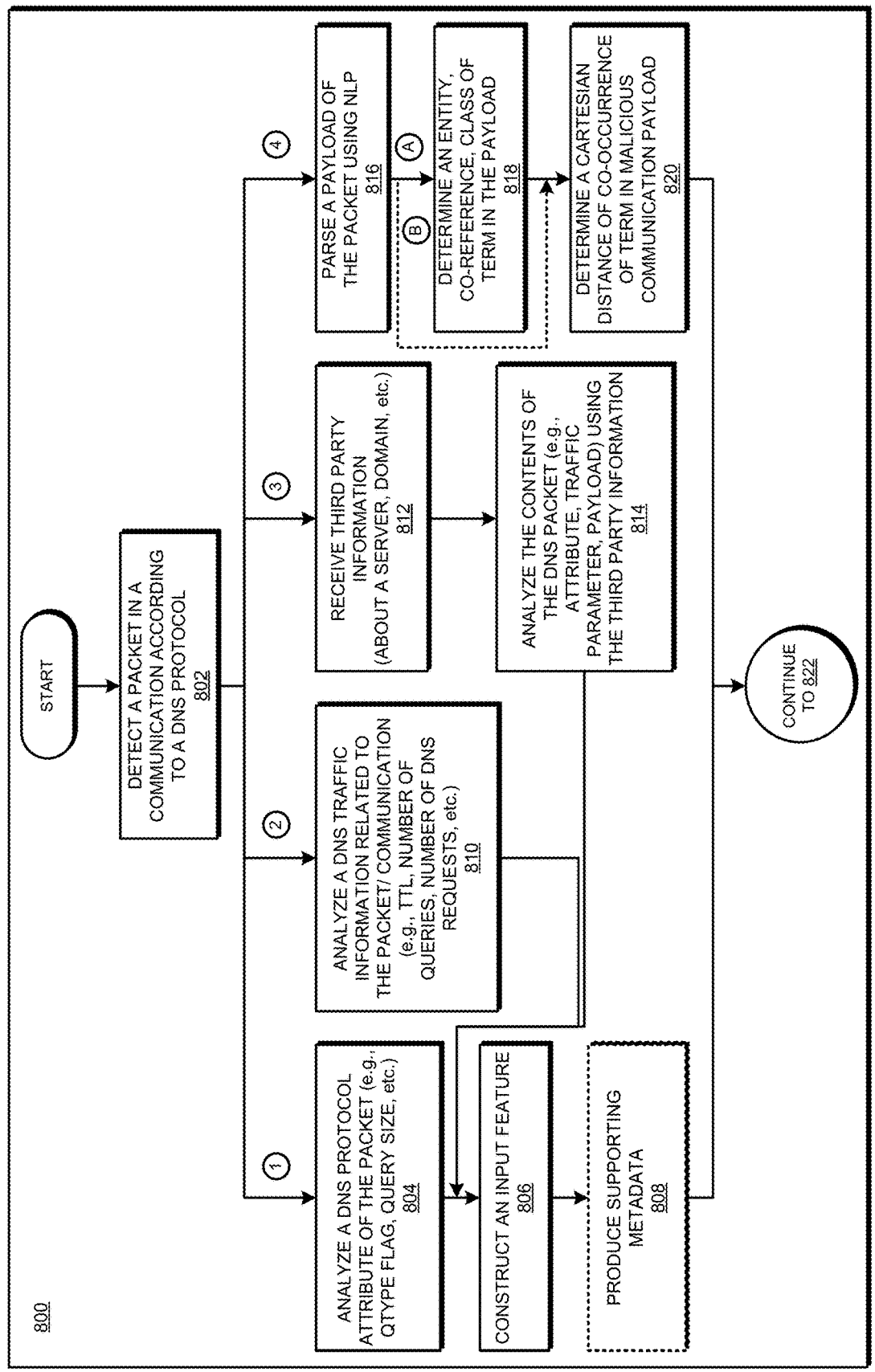
FIGS. 8a-8B depict a flowchart of an example process for cognitive and contextual detection of malicious DNS tunneling in accordance with an illustrative embodiment.
Figure 8B:
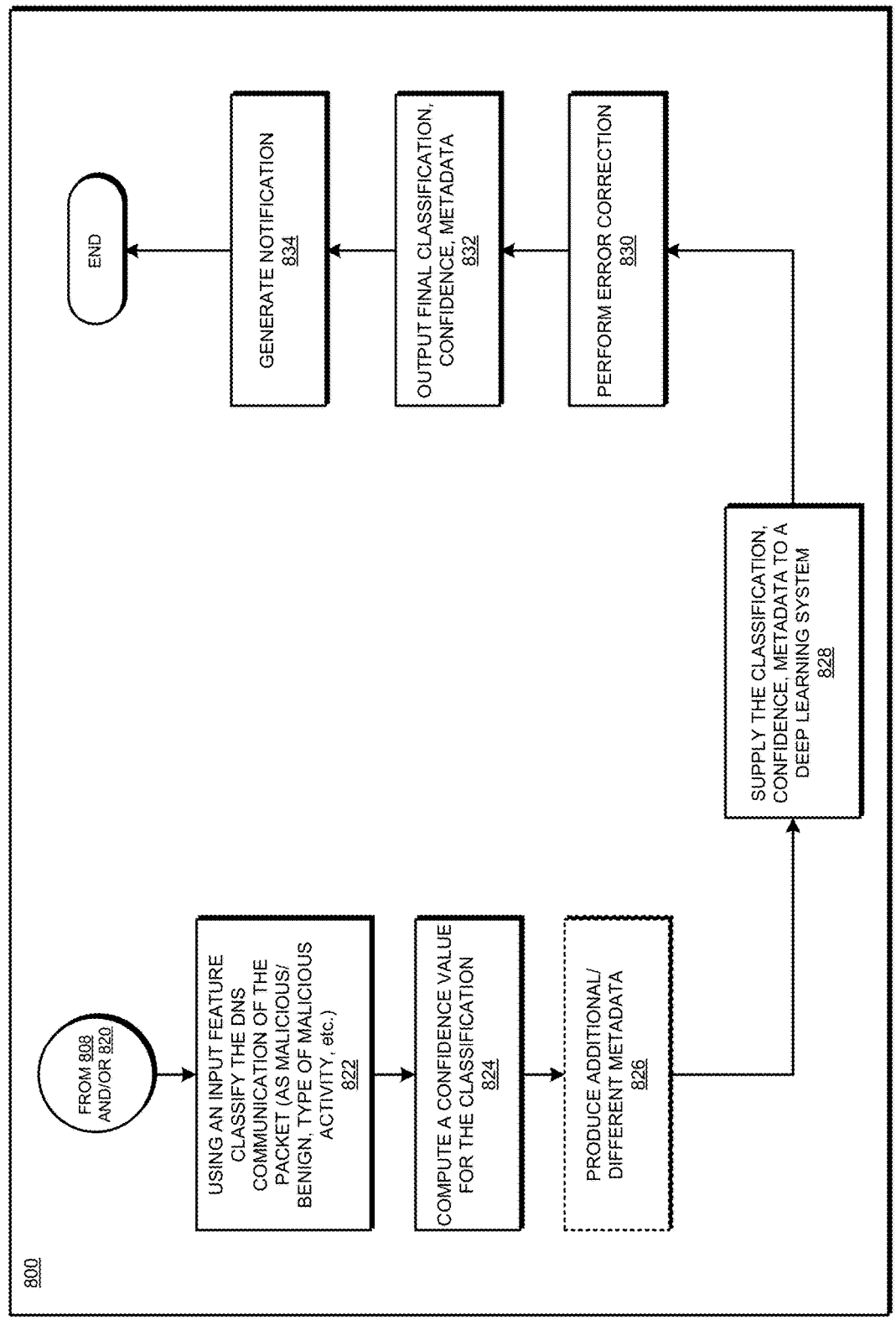

With reference to FIGS. 8A-8B, these figures depict a flowchart of an example process for cognitive and contextual detection of malicious DNS tunneling in accordance with an illustrative embodiment. Process 800 can be implemented in application 702 in FIG. 7.

The application detects, intercepts, or otherwise receives a packet in a data communication occurring according to the DNS protocol (block 802). Thereafter, the application can take any combination of the four following paths through process 800. In other words, the application may use the analysis of any of the first, second, third, or fourth paths alone, or the application may use the analysis of any two or more of the first, second, third, or fourth paths described herein.

According to a first path through process 800, the application analyzes a DNS protocol attribute of the packet, e.g., a QTYPE, a query size, a TXT record size, and others as described herein (block 804). The application constructs an input feature, which in the first path is an attribute-based input feature (block 806). The application optionally produces supporting metadata for the attribute-based input feature (block 808).

According to a second path through process 800, the application analyzes a DNS traffic parameter related to the DNS packet or the DNS communication of which the packet is a part, e.g., a Time To Live (TTL), number of queries, number of DNS requests, and others as described herein (block 810). The application constructs an input feature, which in the second path is a traffic parameter-based input feature at block 806. The application optionally produces supporting metadata for the traffic parameter-based input feature at block 808.

According to a third path through process 800, the application receives information from a third-party data source, e.g., information about a domain, a server, an address, and others as described herein (block 812). The application analyzes by cross-correlating a content of the DNS packet or the DNS communication of which the packet is a part, with the third-party information (block 814). The application constructs an input feature, which in the third path is a cross-correlated attribute-based input feature, traffic parameter-based input feature, or payload-based input feature, at block 806. The application optionally produces supporting metadata for the appropriate input feature at block 808.

According to a fourth path through process 800, the application parses a payload of the packet using NLP (block 816). Thereafter, the application follows either sub-path A, or sub-path B, or both sub-paths.

In sub-path A, the application configures an RNN and determines an entity, a co-reference, and a class of a term in the payload (block 818). In sub-path B, the application configures an RNN and determines a Cartesian distance between malicious co-occurrences of a term in the payload (block 820). In case where the application uses both sub-paths, the application performs blocks 818 and 820. The entity, co-reference, class, Cartesian distance or a combination thereof can be regarded as a cognitive input feature.

From block 808 for paths 1, 2, or 3, or from block 820 for path 4, or from both blocks, the application proceeds to block 822. Using one or more input features created earlier in process 800, the application classifies the DNS communication of the packet, e.g., as malicious or benign, or using a set of types of maliciousness, and so on (block 822).

The application computes a confidence value for the classification (block 824). The application optionally produces additional or different metadata as described herein (block 826).

In one embodiment, the application ends process 800 thereafter. In another embodiment, the application supplies the classification, the corresponding confidence, and the supporting metadata to a deep learning system (block 828). The deep learning system trains or retrains an RNN using the classification, the corresponding confidence, and the supporting metadata.

In one embodiment, the application ends process 800 thereafter. In another embodiment, the application performs an error correction on the classification, the corresponding confidence, and the supporting metadata (block 830). The application outputs a final or error-corrected classification, corresponding confidence, and supporting metadata (block 832).

When malicious classification with a predetermined confidence value or higher is found, the application produces a notification to an administrator user or system to take further actions with the malicious DNS communication (block 834). The application ends process 800 thereafter.

Thus, a computer implemented method, system or apparatus, and computer program product are provided in the illustrative embodiments for cognitive and contextual detection of malicious DNS tunneling and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
constructing, from a record of a packet in a Domain Name System (DNS) communication between a DNS client and a DNS server, an input feature;
computing, using the packet, a metadata item supporting the input feature;
computing a set of weights corresponding to a set of nodes in a recurrent neural network (RNN) by passing a term and a set of words to a function, wherein the term and the set of words are parsed from a payload of the record in the packet;
applying the set of weights to the set of nodes in the RNN to output an entity of the term, a co-reference of the term, and a class of the term;
computing a confidence value corresponding to the entity of the term, the co-reference of the term, or the class of the term;
classifying, using a processor and a memory to execute a cognitive classification model, and by supplying the input feature and the metadata item as inputs to the cognitive classification model, a transmission of the packet as malicious use of DNS tunneling between the DNS client and the DNS server, the classifying using the confidence value and one of the entity of the term, the co-reference of the term, or the class of the term;
outputting, from the cognitive classification model, a classification of the packet as malicious, and the confidence value in the malicious classification; and
causing, by generating a notification, the DNS client to cease the malicious use of the DNS tunneling.

2. The method of claim 1, further comprising:
extracting a DNS protocol attribute from the packet, wherein the DNS protocol attribute is based on the record, wherein the DNS protocol attribute is a characteristic of a data field inside the packet, the data field being a part of the record, and wherein the characteristic is distinct from an actual value of a content of the data field; and
using the DNS protocol attribute as the input feature.

3. The method of claim 2, wherein the DNS protocol attribute comprises an encoding used in populating the data field with the content, and wherein the data field is expected to be populated with the content in a form other than the encoding.

4. The method of claim 2, wherein the DNS protocol attribute comprises a first character set used in populating the data field with the content, and wherein the data field is expected to be populated with the content using a second character set.

5. The method of claim 2, wherein the DNS protocol attribute comprises an entropy of the content relative to a second content of another packet in the DNS communication over a period.

6. The method of claim 2, wherein the DNS protocol attribute comprises an numerosity of the record in the packet, wherein the numerosity exceeds a threshold number.

7. The method of claim 2, wherein the DNS protocol attribute comprises an numerosity of the data field in the record, wherein the numerosity exceeds a threshold number.

8. The method of claim 1, further comprising:
computing a DNS traffic parameter from the packet, wherein the DNS traffic parameter is a characteristic associated with a DNS communication based on the record, and wherein the characteristic is distinct from an actual value of a content in a data field inside the packet; and
using the DNS traffic parameter as the input feature.

9. The method of claim 8, wherein the DNS traffic parameter comprises a number of transmission over a period of packets having a type of the packet, wherein the number exceeds a threshold number.

10. The method of claim 8, wherein the DNS traffic parameter comprises a number of requests over a period of a type of request contained in the packet, wherein the number exceeds a threshold number.

11. The method of claim 8, wherein the DNS traffic parameter comprises a number of responses over a period of a type of response contained in the packet, wherein the number exceeds a threshold number.

12. The method of claim 8, wherein the DNS traffic parameter comprises a volume of transmitted data over a period to the DNS server, the transmitted data including the packet, wherein the volume exceeds a threshold volume.

13. The method of claim 8, wherein the DNS traffic parameter comprises a volume of transmitted data over a period relating to a particular domain, the transmitted data including the packet, wherein the volume exceeds a threshold volume.

14. The method of claim 8, wherein the DNS traffic parameter comprises a frequency of transmitted data over a period to the DNS server, the transmitted data including the packet, wherein the frequency exceeds a threshold frequency.

15. The method of claim 1, further comprising:
parsing the payload of the record in the packet, wherein the payload is an actual value of a content in a data field of the record inside the packet;
selecting the term in the parsed payload;
selecting the set of words in the parsed payload, the set of words including the term; and
using a classification of the cognitive output and the confidence value to classify the DNS communication as malicious.

16. The method of claim 1, further comprising:
using the class of the term in the classification.

17. The method of claim 15, further comprising:
configuring the function such that, when the set of weights is applied to the corresponding set of nodes, for the term, the RNN outputs a Cartesian distance between malicious co-occurrences of the term in the DNS communication; and
detecting co-occurrences at the Cartesian distance in the payload; and
using the detecting in the classification.

18. The method of claim 1, further comprising:
constructing a second input feature, wherein the input feature comprises a DNS protocol attribute of the packet, and wherein the second input feature comprises a DNS traffic parameter of the DNS communication including the packet;
constructing a third input feature, wherein the third input feature comprises a term in a payload of the packet;
cross-correlating at least one of the input feature, the second input feature, and the third input feature with information from a third-party data source; and
using the cross-correlated at least one of the input feature, the second input feature, and the third input feature in the classifying.

19. A computer usable program product comprising a computer readable storage device including computer usable code, the computer usable code comprising:
computer usable code for constructing, from a record of a packet in a Domain Name System (DNS) communication between a DNS client and a DNS server, an input feature;
computer usable code for computing, using the packet, a metadata item supporting the input feature;
computer usable code computing a set of weights corresponding to a set of nodes in a recurrent neural network (RNN) by passing a term and a set of words to a function, wherein the term and the set of words are parsed from a payload of the record in the packet;
computer usable code applying the set of weights to the set of nodes in the RNN to output an entity of the term, a co-reference of the term, and a class of the term;
computer usable code computing a confidence value corresponding to the entity of the term, the co-reference of the term, or the class of the term;
computer usable code classifying, using a processor and a memory to execute a cognitive classification model, and by supplying the input feature and the metadata item as inputs to the cognitive classification model, a transmission of the packet as malicious use of DNS tunneling between the DNS client and the DNS server, the classifying using the confidence value and one of the entity of the term, the co-reference of the term, or the class of the term;
computer usable code for outputting, from the cognitive classification model, a classification of the packet as malicious, and the confidence value in the malicious classification; and
computer usable code for causing, by generating a notification, the DNS client to cease the malicious use of the DNS tunneling.

20. A data processing system comprising:
a storage device, wherein the storage device stores computer usable program code; and
a processor, wherein the processor executes the computer usable program code, and wherein the computer usable program code comprises:
computer usable code for constructing, from a record of a packet in a Domain Name System (DNS) communication between a DNS client and a DNS server, an input feature;
computer usable code for computing, using the packet, a metadata item supporting the input feature;
computer usable code computing a set of weights corresponding to a set of nodes in a recurrent neural network (RNN) by passing a term and a set of words to a function, wherein the term and the set of words are parsed from a payload of the record in the packet;
computer usable code applying the set of weights to the set of nodes in the RNN to output an entity of the term, a co-reference of the term, and a class of the term;
computer usable code computing a confidence value corresponding to the entity of the term, the co-reference of the term, or the class of the term;
computer usable code classifying, using a processor and a memory to execute a cognitive classification model, and by supplying the input feature and the metadata item as inputs to the cognitive classification model, a transmission of the packet as malicious use of DNS tunneling between the DNS client and the DNS server, the classifying using the confidence value and one of the entity of the term, the co-reference of the term, or the class of the term;

computer usable code for outputting, from the cognitive classification model, a classification of the packet as malicious, and the confidence value in the malicious classification; and computer usable code for causing, by generating a notification, the DNS client to cease the malicious use of the DNS tunneling.

* * * * *